United States Patent [19]

Helm et al.

[11] Patent Number: 4,863,676

[45] Date of Patent: Sep. 5, 1989

[54] INHERENTLY SAFE, MODULAR, HIGH-TEMPERATURE GAS-COOLED REACTOR SYSTEM

[75] Inventors: John L. Helm, Groton; John S. Leonard, Lyme, both of Conn.

[73] Assignee: Proto-Power Corporation, Groton, Conn.

[21] Appl. No.: 810,993

[22] Filed: Dec. 19, 1985

[51] Int. Cl.⁴ ............................................. G21C 15/18
[52] U.S. Cl. ................................... 376/299; 376/293; 376/381; 376/406
[58] Field of Search ............... 376/298, 299, 293, 381, 376/406; 165/166

[56] References Cited

U.S. PATENT DOCUMENTS

| | | |
|---|---|---|
| 3,115,450 | 12/1963 | Schanz . |
| 3,210,253 | 10/1965 | Huntington . |
| 3,235,463 | 2/1966 | Sankovich . |
| 3,245,879 | 4/1966 | Purdy et al. . |
| 3,276,965 | 10/1966 | Leyse . |
| 3,290,222 | 12/1966 | Schoessow et al. ............... 376/406 |
| 3,312,596 | 4/1967 | Grain ................................... 376/406 |
| 3,725,198 | 4/1973 | Harstead et al. .................... 376/293 |
| 3,748,227 | 7/1973 | Hillekum et al. ................... 376/293 |
| 3,752,738 | 8/1973 | Naymark . |
| 4,213,824 | 7/1980 | Jabsen ................................. 376/293 |
| 4,298,059 | 11/1981 | Krauth et al. ....................... 165/166 |
| 4,331,512 | 5/1982 | Facha et al. . |
| 4,508,677 | 4/1985 | Craig et al. ......................... 376/293 |

FOREIGN PATENT DOCUMENTS

| | | | |
|---|---|---|---|
| 3009390 | 9/1981 | Fed. Rep. of Germany ...... 376/381 |
| 3212266 | 6/1983 | Fed. Rep. of Germany ...... 376/299 |
| 3435255 | 4/1986 | Fed. Rep. of Germany ...... 376/299 |
| 1374640 | 8/1964 | France ................................ 376/293 |
| 2506063 | 11/1982 | France ................................ 376/293 |
| 6602176 | 8/1967 | Netherlands ....................... 376/293 |

OTHER PUBLICATIONS

J. Br. Nucl. Energy Soc., 1975, 14, Apr., No. 2, 105-118.
Kugeler et al. "Considerations on High Temperature Reactors for Process Heat Applications", Nuclear Engineering and Design, 34 (1975), 15-32.
Wolf et al. "Fuel Elements of the High Temperature Pebble Bed Reactor" Nuclear Engineering and Design, 34 (1975) 93-108.
Knuefer, "Preliminary Operating Experiences with the AVR at an Average Hot-Gas Temperature at 950° C." Nuclear Engineering and Design, 34 (1975), 73-83.
Petersen et al. "Inherent Stabilization-The Basic Principle for a New HTR Design" Institute of Modern Physics, vol. 47, Supplement No. 1, Summer 1975 at s25-s35.
Technical Report entitled "High Temperature Reactor Modular System for the Generation of Process Heat, GHT", Bergisch Gladbach 1, Oct. 1981.

Primary Examiner—Deborah L. Kyle
Assistant Examiner—Richard W. Wendtland
Attorney, Agent, or Firm—Pasquale A. Razzano

[57] ABSTRACT

In a high-temperature gas-cooled nuclear reactor system, which is suitable for modular utilization in combination with one or more other similar nuclear reactor systems, an arrangement which comprises passive heat sink means for absorbing decay heat energy generated at a reactor core included within said reactor system; and means for removing heat energy from said heat sink means at a rate sufficient to maintain the capacity of the heat sink means for absorption of decay heat energy such that release of fission products resulting from loss of forced circulation of gas coolant, or such loss in combination with coolant depressurization, when the reactor is critical and at power is prevented, thereby to provide safety means independent of human or automatic activation; and method embodiments corresponding to same.

21 Claims, 6 Drawing Sheets

INHERENTLY SAFE, MODULAR, HIGH-TEMPERATURE GAS-COOLED REACTOR SYSTEM

FIELD OF THE INVENTION

The present invention relates to the generation of heat energy by a nuclear reactor, and more particularly, to a nuclear reactor exhibiting improved safety characteristics, as well as a method of increasing the safety characteristics of a nuclear reactor.

BACKGROUND OF THE INVENTION

Two highly important uses of heat energy obtained with nuclear power are the generation of electrical power and the generation of industrial process heat.

As for the generation of electrical power, to date the art's focus has been on large monolithic water-cooled reactors with the exception of the large carbon dioxide cooled designs used in the United Kingdom. Such water-cooled reactors have a maximum temperature of operation of about 600° F., which severely limits their utility for industrial process heat applications (which are normally carried out at higher temperatures). Furthermore, even in their use for electrical power generation, large monolithic water-cooled reactors exhibit substantially disadvantageous characteristics. Examples are the great cost of maintaining acceptably safe operating conditions, and the threat of possible exposure to radiation of humans in the vicinity of the reactor. These characteristics significantly detract from the usefulness of such reactors in generating electrical power. The great cost of maintaining safe operating conditions substantially undercuts the economic viability of using such reactors. Also, the comparably substantial cost of protecting humans from radiation exposure also has an adverse impact on operating and maintenance costs.

Further, as can be appreciated by the skilled worker, when a water-cooled nuclear reactor is subjected to loss of forced cooling the heat-up rate of the reactors' metallic-clad fuel due to heat-energy input (decay heat from reactor's fuel, stored heat, and heat from the metal-water reaction) is exceedingly rapid. Temperatures resulting in cladding failure are reached in a matter of seconds with the consequent release of fission products from the reactor's fuel elements.

As an alternative to the problematical large monolithic water-cooled reactors, the art can turn to large high-temperature helium gas-cooled graphite-moderated nuclear reactors. These reactors are an advance beyond carbon dioxide gas cooled graphite-moderated designs whose temperature is constrained by the properties of carbon dioxide. They have the advantage that they can be operated at temperatures up to about 1750° F., which permits their use under conditions normally required for efficient electric power generation, and otherwise meets a wide range of industrial process heat generation requirements.

These large high-temperature helium gas-cooled graphite-moderated reactors, in contrast to the water-cooled variety discussed above, have a much slower heat-up rate. Temperatures at which the danger of fission product release is posed are reached only after the passage of several hours from the time of loss of forced cooling. Furthermore, since metal cladding is not employed in these high-temperature reactors to effect fission product retention, the danger of metal cladding failure at high temperature is obviated. Rather than rapid and catastrophic failure, the failure mode encountered in such high-temperature reactors is gradual, initially constituting a slow diffusion, through a ceramic barrier, of fission products from the fuel particles which are found in the reactor's core (geometric stability of the elements is maintained).

Nonetheless, the high-temperature helium gas-cooled reactors discussed in the preceding paragraphs are also subject to some shortcomings. First, even though these reactors are more resistant than water-cooled reactors to the effects of loss of forced cooling, they too reach a state at which fission products can be released from the reactor core due to uncontrolled heat-up. Additionally, due to their large size, these reactors cannot be fabricated in a controlled factory environment, but must be assembled on-site in the field. This requirement introduces a significant increase in the cost of reactor fabrication. Moreover, each large reactor must be tailor-made for the application to which it is put and the locale in which it is situated. This factor also increases the cost of reactor fabrications substantially, as standardization of design is rendered infeasible.

Thus, the state of the art leaves much to be desired.

OBJECTS OF THE INVENTION

It is an object of the invention to provide a source of nuclear-energy generated heat that is inherently safe compared to sources currently available by virtue of its compensation for the loss of substantial forced cooling conditions through the provision of passive cooling means independent of operator action.

It is another object of the present invention to provide a source of nuclear-energy generated heat equipped with a passive safety means in the form of a continuously operating heat sink limiting the maximum fuel temperature of the source to a value at which fission products are not released.

It is still another object of the present invention to provide a source of nuclear-energy generated heat which enables continuation of the source's operation at a reduced power level even in the event of a decrease in pressure of the cooling system without the imposition of substantial risk of damage to the environment due to leakage of fission products.

It is a further object of the invention to provide a barrier to a contaminating interchange between radioactive materials leaking from the reactor system (e.g., radioactive materials in contaminated coolant substances, or from shattered fuel elements expelled from the fuel handling system after rupture thereof) and the atmosphere.

It is yet another object of the present invention to provide a source of nuclear-energy generated heat that is more economically built, operated, maintained and decommissioned than large reactors currently available.

These and other objects are met by the present invention.

STATEMENT AND ADVANTAGES OF THE INVENTION

In one of its aspects, the invention is an arrangement, in a high-temperature gas-cooled nuclear reactor system, which comprises passive heat sink means for absorbing decay heat energy generated in a reactor core included within said reactor system; and means for removing heat energy from said heat sink means at a rate sufficient to maintain the capacity of the heat sink means for absorption of decay heat energy such that the release of fission products resulting from loss of forced circulation of gas coolant, or such loss combined with coolant depressurization, when the reactor is critical and at power is prevented.

In another of its aspects, the invention is in a method of adapting a high-temperature gas-cooled nuclear reactor to prevent release of fission products due to overheating which method comprises disposing passive heat sink means in association with said reactor, such that said means is positioned for the absorption of decay heat energy from a reactor core included within the reactor; and providing, in operative association with said heat sink means, means for removing heat energy therefrom at a rate sufficient to maintain the capacity of the heat sink means for absorption of decay heat energy such that the release of fission products resulting from loss of forced circulation of gas coolant, or such loss combined with coolant depressurization, when the reactor is critical and at power is prevented.

In still another of its aspects the invention is in a method of preventing release of fission products due to overheating from a small high-temperature gas-cooled nuclear reactor, which method comprises absorbing, with passive heat sink means disposed in association with said reactor, an amount of decay heat energy generated in a reactor core included within the reactor; and removing heat energy from said heat sink means at a rate sufficient to maintain the capacity of the heat sink means for absorption of decay heat energy such that release of fission products resulting from loss of forced circulation of gas coolant, or such loss in combination with coolant depressurization, when the reactor is critical and at power is prevented.

Numerous advantages accrue with the practice of the present invention. Operation of the nuclear reactor system of the invention provides reactor operation which is inherently safe, both from the standpoint of the health and safety of the general public and the continued security of the investment in the nuclear plant itself, since release of fission products is prevented by passive means only. That is to say, with the present invention the necessary dissipation of decay heat energy from the reactor core to prevent occurrence of a temperature at which fission products are released is achieved by the transfer of decay heat energy from the core to the heat sink around it. The passive heat dissipation feature is operative without either human or automatic implementation, and is thus immune from the vicissitudes of human or machine error. Additionally, since the decay heat energy generated by the reactor core is dissipated even without the contribution of the invention's forced cooling system, the reactor of the invention can be operated at a scaled-down level even during loss of forced circulation of the cooling system and/or a decrease in pressurization of the cooling system. Moreover, because of its configuration, the reactor system provided by the invention is more easily and economically constructed and used, is more easily and reliably inspected throughout its life, and can be maintained and repaired as well as decommissioned more conveniently than larger, more specialized reactors.

In the following sections the invention is described in greater detail to illustrate several of its embodiments.

DESCRIPTION OF CERTAIN PREFERRED EMBODIMENTS

The nuclear reactor system of the invention typically includes a reactor pressure vessel, a reactor core enclosed in said pressure vessel with fuel elements arranged to form a pebble bed reactor, and a pressurized forced gas circulation system. The reactor system is advantageously adapted so that it is utilized—when the need for energy exceeding the system's output exists—in combination with other similar nuclear reactor systems. Also, the size of the system is in certain advantageous embodiments sufficiently small so that its fabrication can feasibly be carried out under controlled factory conditions rather than on-site, thus saving costs.

A fundamental aspect of the present invention is the provision of passive means for dissipation of decay heat energy generated at the reactor core to complement the operation of the gas cooling system utilized to remove heat from the reactor core. This aspect of the invention is important because of the following characteristics of high-temperature gas-cooled reactors. More specifically, if, when the reactor is critical and at power, coolant circulation stops, or if in addition the coolant undergoes depressurization (thereby decreasing the amount of coolant molecules per unit volume and correspondingly the capacity of the coolant to absorb heat), the fuel temperature increases. The temperature at which the temperature coefficient of reactivity has caused the reactor to shut down, and the temperature at which fission products begin to escape from the spherical fuel particles used in the fuel elements of the reactor core, for example 1600° C., can be reached. The escape of fission products from the fuel particles clearly must be avoided because this increases the possibility of their escape to the atmosphere and of their becoming a possible safety hazard to the public.

However, with the present invention, the provision of passive cooling means has the effect that if forced coolant circulation is stopped with the reactor critical and at power, and even if the cooling system is additionally depressurized, the fuel temperature increase (assuming control rods are not inserted) is insufficient to push the reactor core temperature over that at which the fission products are released. Accordingly, the present invention is a significant technical advance in that, by the provision of the aforementioned passive cooling means, reactor core heat energy, which if undissipated would lead to the release of fission products from the fuel elements, is safely disposed of without need to rely upon manually or automatically activated safety means and without loss of fission products.

Figure 1:
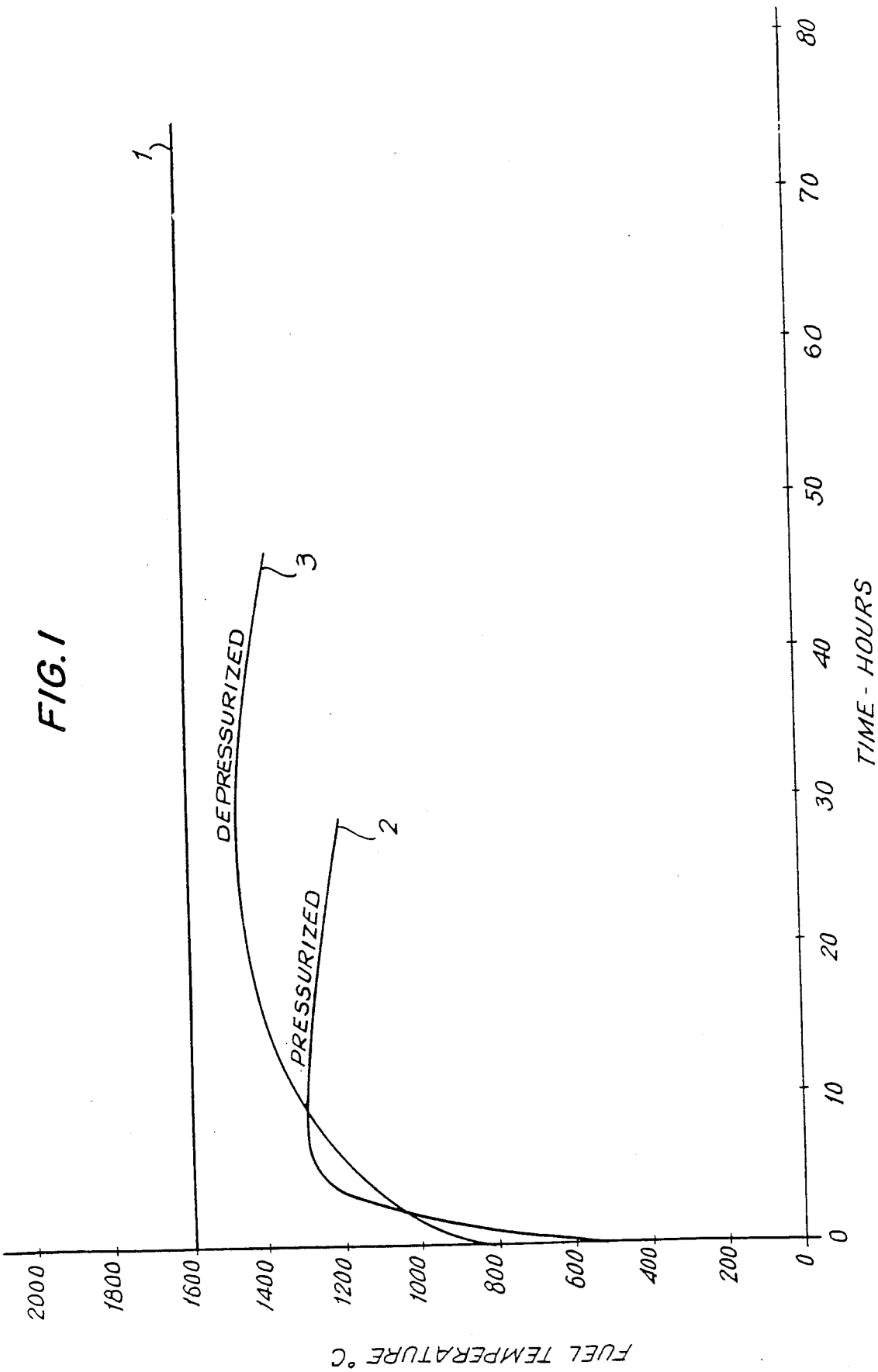
FIG. 1 is a plot of fuel temperature against time elapsed since loss of forced cooling for a high-temperature gas-cooled reactor system of the invention.
Figure 2:
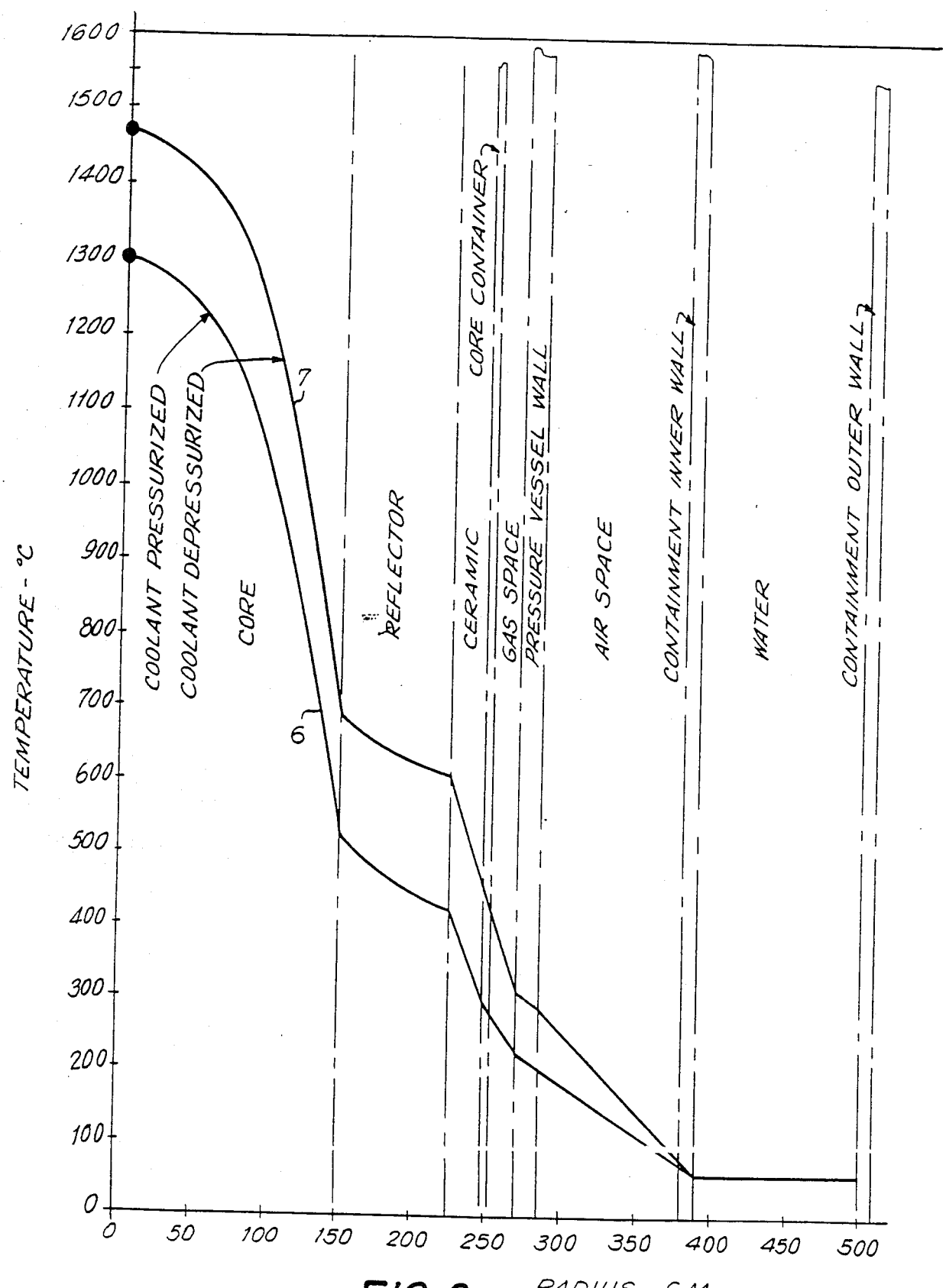
FIG. 2 is a plot of temperature in a reactor system according to the invention against the radial distance from the core's longitudinal axis.

The charts of FIGS. 1 and 2 clearly illustrate the foregoing. FIG. 1 is a plot of fuel temperature in a hypothetical reactor system according to the invention against time elapsed since loss of forced cooling. Line 1 shows the temperature limit at or above which fission product diffusion from the nuclear fuel particles begins, here 1600° C. Curve 2 illustrates the temperature in the nuclear fuel particles when forced gas coolant circulation ceases, but the coolant remains appropriately pressurized Curve 3 depicts the temperatures reached in the nuclear fuel particles when forced circulation ceases and when the primary cooling system is depressurized. It is clear from FIG. 1 that in neither instance does the temperature of the nuclear fuel elements reach the 1600° C. limit. In FIG. 2 there is presented a radial profile of maximum fuel temperature reached at various locations in a hypothetical reactor system according to the invention (the system has a cylindrical core cooled by axial flow of the coolant) following a complete loss of forced cooling. The locations selected are those of components typically incorporated in a reactor system according to the invention (see following FIGS. 3 to 6). FIG. 2 is accordingly a plot of such temperatures against the radial distance of the location indicated on the chart from the center of the core. From the chart, temperatures in the core, in the adjoining graphite reflector material, in the coating, at the core container, in the gas space between the core container and the pressure vessel wall, in the pressure vessel wall itself, in the air space between that wall and the inner wall of the containment vessel, at the containment inner wall and in the water held in the containment tank can be ascertained. Curve 6 shows those maximum temperatures when forced coolant circulation ceases but the system remains pressurized, and curve 7 shows the maximum temperatures reached when forced coolant circulation ceases and the system becomes depressurized. Again, the maximum fuel temperatures do not reach the 1600° C. limit at which nuclear fission products begin to diffuse from the fuel particles.

Passive heat sink means are provided in accordance with the present invention by incorporating in a high-temperature gas-cooled nuclear reactor system a heat sink which absorbs heat energy given off by the reactor core at all times when the reactor is critical and at power or shut down and releasing decay heat, regardless of whether the reactor's forced gas cooling system is fully operational or not. The heat sink generally comprises a body of liquid material, typically water but suitably other materials which are liquid at the temperatures encountered in the environment of a nuclear reactor system and which vaporize upon the absorption of the heat energy which travels to the heat sink by convection, conduction, and or radiation. The liquid is positioned so as to be effective in absorbing decay heat energy given off by the reactor core. This is suitably accomplished by disposing a containment vessel about the reactor pressure vessel containing the reactor core, part of which containment vessel is actually a tank means integral with the containment vessel itself. The tank means suitably comprises inner and outer walls between which there is a volume for occupation by the body of liquid. The reactor pressure vessel which contains the reactor core is preferably circular in cross-section, and accordingly tank means forming part of the containment vessel is correspondingly disposed about the reactor pressure vessel in annular fashion.

The above-discussed arrangement provides a sink for heat energy, especially decay heat energy, which is generated in the reactor core and travels to the boundary of the reactor pressure vessel, into the chamber between the containment vessel and the reactor pressure vessel, and through the inner wall of the tank portion of the containment vessel. In order to provide for a continuing effective absorption by the heat sink of such heat energy, the absorbed heat energy is removed from the liquid so as to maintain its capacity for further absorption. This is done by providing means to remove that heat energy in operative association with the heat sink means, e.g., with the tank and the liquid which resides therein. That removal means is suitably condenser means, typically one or a plurality of condensers to which the vapor given off by the heat sink is directed by appropriate conduit, ducting, or the like. A suitable condenser is, for instance, a convectively cooled air condenser; however, other types of conventional condensers are also utilizable in the present invention. The condenser means is generally sized so that heat energy is removed from the vapor in sufficient amounts so that the resulting liquid can be returned to the tank means for the purpose of establishing boiling equilibrium conditions allowing for the continuous removal of decay heat energy absorbed by the heat sink. The return of condensed liquid is accomplished by providing suitable conduit, ducting or the like by which the liquid can be directed back into the tank means of the containment vessel.

Examples of suitable condenser/recycling systems are conventional one-pipe and two-pipe systems. In the one-pipe system, vapor is conducted to the condenser means, and liquid recycled to the tank means holding the liquid body through the same pipe, the flow of vapor and return flow of liquid being countercurrent. In a two-pipe system, separate pipes are provided for the flow of vapor to the condenser and the return flow of liquid to the heat sink, respectively.

The aforementioned boiling equilibrium conditions can vary over a wide range, and are suitably carried out under atmospheric or subatmospheric pressures. In a preferred embodiment of the invention, boiling equilibrium is established for a body of water acting as the heat sink at about 150° F.

Thus, a continuously operating passive heat energy dissipation device is implemented.

It will readily be appreciated that, in accordance with the foregoing, a method of adapting a high-temperature gas-cooled nuclear reactor system to prevent accidental release of fission products due to overheating advantageously comprises disposing a containment vessel about reactor pressure vessel (containing the reactor core) as aforesaid. The containment vessel, comprising tank means including an inner wall and an outer wall, is positioned for absorption of decay heat energy from the reactor core by a body of liquid which the tank means is adapted to hold. The method additionally comprises the steps of providing, in operative association with said tank means, means for removing heat from vapor given off by said body of liquid as a result of said absorption of decay heat energy; and providing, in operative association with said tank means and said heat removal means, means for returning liquid, resulting from the removal of heat from said vapor, to said tank means.

The techniques for assembling the components are those normally utilized in the art.

Also in accordance with the foregoing, the invention provides an advantageous method of preventing release of fission products due to overheating from a high-temperature gas-cooled nuclear reactor. The method includes the steps of absorbing in a body of liquid, which is disposed about a reactor pressure vessel (containing the reactor core) as previously explained, an amount of decay heat energy generated in the reactor core; removing heat energy from vapor given off by said body of liquid as a result of said absorption of decay heat energy; and returning liquid, resulting from removal of heat energy from said vapor, to the body of liquid.

These, and other more specific embodiments of the present invention, are further described with reference to several annexed figures of drawing as follows.

Figure 3:
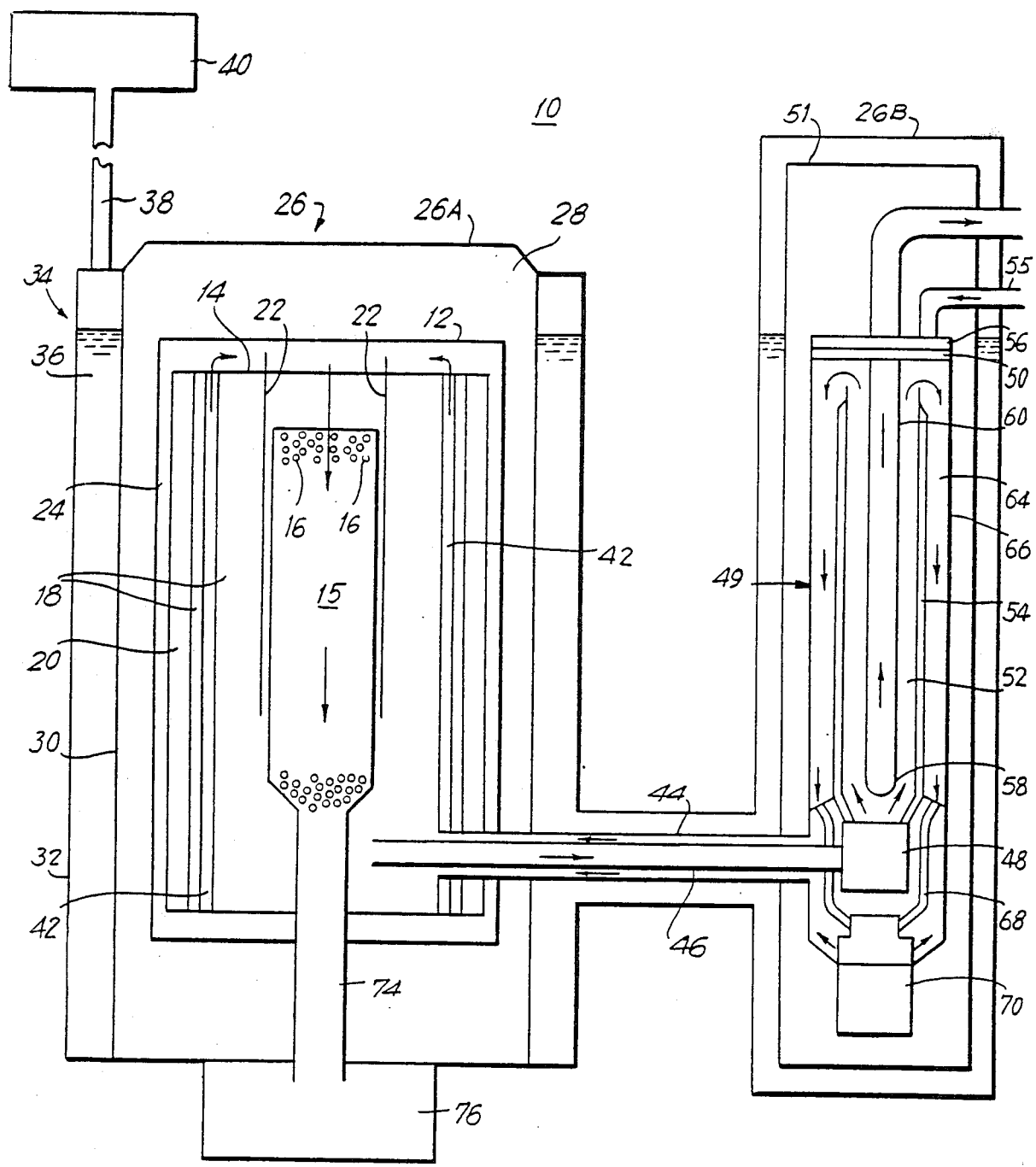
FIG. 3 is a schematic representation of a cross section of a reactor system of the invention.

In FIG. 3 there is disclosed a high-temperature helium-cooled graphite moderated reactor system 10. The reactor system includes cylindrical reactor pressure vessel 12 (pressure within illustratively maintained at 50 bar), which is of generally cylindrical configuration, made of steel, about 550 cm. in diameter, and about 2,400 cm. in height. Disposed within reactor pressure vessel 12 is cylindrical core container 14 which is also made of steel. The core container is about 500 cm. in diameter and about 1,700 cm. in height. Centrally located within core container 14 is core 15 of cylindrical configuration and comprising spherical fuel elements 16, about 2.5 inches in diameter.

Core 15 is advantageously of the pebble bed type. The pebble bed combines a stable structure with a moderator, adequate gas-flow path for cooling, and simple means for fueling and defueling. The core diameter is conveniently adapted to maintain a sufficiently low nuclear fuel temperature, even when there is a loss of forced coolant circulation and/or a depressurization of the cooling system, to preclude a significant release of fission products.

The design of the spherical nuclear fuel elements 16 is also a point of interest. The fissionable fuel material is in the form of coated particles. It is distributed uniformly throughout the central matrix of the fuel element balls. The fuel particles are coated with several layers of pyrocarbon and silicon carbide to form a pressure tight barrier against fission product release, and embedded in a bed of graphite balls in the core, thereby positioning the radioactive fuel particles geometrically, and accomplishing moderation of the nuclear reaction. One advantage of utilizing such elements is that the use of metallic cladding on the nuclear fuel elements is obviated, which cladding materials are subject to quick meltdowns with a resultant release of fission products. In contrast, the spherical fuel elements containing multi-coated fuel particles incorporated in accordance with the present invention, because of the absence of metallic cladding for fission product retention, have a heat resistant tolerance which is substantially superior to that of metal-clad fuel elements Failure of the multi-coated fuel particles is gradual and non-catastrophic, being initially in the form of slow diffusion of fission products through the particle coatings and then from the fuel elements with geometric stability maintained.

An additional advantage of using such a high temperature helium cooled graphite moderated reactor using multi-coated fuel particles and graphite fuel elements is the wide range of uranium enrichment of the fuel that can be utilized. Through the use of such fuel, the proliferation resistance of the present invention is enhanced compared to light-water reactors. This results from the fact that enrichment levels of 20% or less are suitable for practicing the present invention, which enrichment levels are currently regarded, at least for U-235, as "nonsensitive." Furthermore, a high percentage, up to 90%, of the fissile plutonium produced in the reactor is burned up before the spent fuel is discharged. Also, the remaining fissile plutonium in the spent fuel is blended with higher plutonium isotopes which are nuclear poisons and require that the critical mass of such remaining fissile plutonium should it be separated, which is difficult, be up to five times larger than the plutonium of other reactor types. Moreover, isotope separation of uranium in the feed fuel and plutonium in the spent fuel would be necessary to produce fissionable material suitable for use in nuclear explosives; such separation would require sophisticated and complex equipment, and is in any event quite difficult because the spent fuel is radiologically "hot." And, because the spherical fuel element balls are typically about 2.5 inches in diameter, their large size and relatively small numbers make them more easily accounted for than the very small nuclear fuel pellets utilized in, for example, water-cooled reactors.

Within the core container 14 is enclosed a ceramic shell 20 (about 25 cm. thick and about 500 cm. in outer diameter) and within the shell a graphite reflector 18 (about 75 cm. thick and about 450 cm. in outer diameter). Control rods 22 are located within the reactor pressure vessel for insertion into the graphite reflector; the control rods are made of any suitable material which acts as an absorber for neutrons so as to control the fission reaction in the core, for instance, hafnium. The core container 14 is positioned within the reactor pressure vessel 12 so as to form gas space 24 which extends radially from about 250 to about 275 cm. from the core center. Containment vessel 26 has an inner wall 30, which together with top and bottom portions is a pressure vessel also (pressure therein being maintained at about 1 bar) and which encloses the reactor pressure vessel. The portion 30 is about 4,300 cm. in height. That portion is disposed about and spaced from reactor pressure vessel 12 to form a chamber 28 between the two vessels extending radially from about 280 to about 375 cm. from the core center. The containment vessel itself includes an inner tank wall 30 at about 380 cm. from the core center and an outer tank wall 32 at about 500 cm. from the core center, which cooperate with one another to form tank 34 which is adapted to hold a body of liquid, for instance water 36 (extending radially from about 380 to about 500 cm. from the core center), as shown in FIG. 3. The interior of tank 34 communicates via a one-pipe conduit system 38 with condenser 40, which is air-cooled by natural convection.

It is readily appreciated that the reactor pressure vessel core container and containment vessel, in both this and other embodiments of the invention, are preferably not insulated—at least not at locations along the path of travel of the decay heat energy of the reactor core to the heat sink—in order to maximize the efficiency of that heat energy transfer. The reactor pressure vessel, core container and containment vessel are typically fabricated of metal, for example, steel.

It is an advantageous feature of the present invention that a portion of the chamber 28 between containment vessel 26 and the reactor pressure vessel 12 is disposed below the reactor pressure vessel. In some embodiments incorporating this feature, the volume of the portion is sufficiently large to accommodate any amount of the water (or other liquid) which could credibly leak from the tank means into the chamber such that the leaked liquid is held under the reactor pressure vessel and has a stabilized liquid level below the level of the reactor pressure vessel.

The reactor core, surrounding components, reactor pressure vessel and containment vessel are operatively associated with a reactor gas coolant system by means of which the heat energy generated in the core is removed and transferred to another location for the purpose of generating electrical power, supplying industrial process heat or the like. Cooling of the reactor core 15 is largely accomplished through the provision of relatively low temperature, primary gas coolant, for example, helium at a temperature of about 300° C. (although other gases inert to the core components and conditions and having sufficient capacity to absorb heat energy will do). The helium is passed through the core typically in axial direction (i.e., in the same direction as the core's longitudinal axis). Accordingly, in FIG. 3 relatively low temperature reactor coolant gas is conducted to the reactor core in conduit 44, which is about 185 cm. in diameter. The relatively low temperature gas is circulated upwardly through passage(s) 42 and then passed downwardly in axial flow direction through core 15 held within core container 14. During its passage through spherical fuel elements 16, the helium gas absorbs sensible heat generated by the fissionable material in those fuel elements, and becomes "hot," its temperature increasing to about 900° C. The helium gas emerges at the bottom of core 15, and is conducted to conduit 46, which is about 110 cm. in diameter, and which is arranged concentrically within conduit 44. The now-hot helium flows through conduit 46 out of the reactor pressure vessel 12 and into a mixing device 48 which forms part of a heat exchanger system 49 housed within pressure vessel 51 and a surrounding portion of containment vessel 26, which portion is designated 26B (which is cylindrical, about 4,300 cm. high and about 500 cm. in diameter).

It is preferred that, as shown, primary "hot" helium (or other coolant) gas be kept out of contact with pressure-containing components of the reactor system, such as the reactor pressure vessel. Accordingly, in the system of FIG. 3, the primary "hot" helium gas when it emerges from core 15 flows into and through conduit 46 so that it cannot come into contact with reactor pressure vessel 12 in, for example, gas space 24.

In heat exchanger system 49, the primary coolant helium is brought into heat transfer relationship with a secondary coolant gas body, in this case helium of about 200° C. (but alternatively another gas or gases as with the primary coolant), for the purpose of removing heat energy from the primary coolant gas and transporting that energy elsewhere.

As can be seen from FIG. 3, the heat exchanger system is located in the illustrated embodiment outside of reactor pressure vessel 12. However, it is also advantageous in some embodiments of the invention to position the heat exchanger system within the reactor pressure vessel, as illustrated in following FIGS. 4 and 6.

Heat exchanger system 49 includes a supporting cover piece 50 which depends from the inside of the shell or flow skirt 66 of the heat exchanger. A secondary "cold" helium gas header 56 is integral with supporting cover 50 Heat exchange takes place by passage of the primary "hot" helium gas from mixing device 48 into volume 52 (about 260 cm. in diameter and about 1700 cm. in height) in an upward direction, and simultaneous passage of secondary "cold" helium gas from conduit 55 through header 56 into volume 52 in a downward direction, so that the two gas bodies are in countercurrent flow relationship with one another This is suitably effected by the placement of one or more completely removable and replaceable bundles of helically configured (although other configurations are also useful) tubes (not shown for purposes of simplicity) in volume 52, which tubes are hung from supporting cover 50; the primary "hot" helium gas is passed upwardly around the helically configured tubes, while the secondary "cold" gas is passed downwardly through the helically configured tubes, and the heat energy of the primary "hot" helium gas transferred to the secondary "cold" helium gas. The temperature of the secondary helium gas is raised from about 200° C. to about 900° C., and the temperature of the primary helium gas is correspondingly lowered from about 900° C. to about 300° C.

The primary helium gas, so cooled, is redirected underneath the supporting cover 50 and led through annular region 64 which is defined by heat exchanger shell 54 (of about 300 cm. in diameter and about 1,700 cm. in height) and flow skirt 66 (of about 400 cm. in diameter and about 1,700 cm. in height). The primary "cold" helium gas travels downwardly through annular space 64 to conduit 68 through which it is conducted to gas circulator (blower) 70. Circulator 70 feeds the primary "cold" helium gas back into outer conduit 44 through which it is conducted back to reactor core 15 within core container 14 to again absorb heat energy from the spherical fuel elements 16. It is preferable that the motor which drives gas circulator 70 is an electric motor and is fitted with gas or magnetic bearings capable of operating without lubricants, etc. The equipment is mounted on the intermediate heat exchanger within pressurized containment vessel portion 26B. This permits the gas circulator 70 to be located within the pressurized containment vessel because the need for constantly maintaining moving parts is eliminated. In advantageous embodiments of the invention the necessity of sealing moving parts which penetrate the pressure boundary of the reactor system is eliminated.

Meanwhile the secondary helium gas, which has now been heated to a temperature of about 900° C. flows into secondary "hot" helium gas header 58, through which it is conducted into secondary "hot" gas tube 60 (of about 100 cm. in diameter and about 1,900 cm. high). The secondary "hot" helium gas is conducted upwardly through tube 60 and out of the heat exchanger system to another location where it is employed in producing electrical power, providing industrial processing heat, or the like.

As is clear from the foregoing discussion, the primary and secondary gas coolant bodies, although in heat transfer relationship, are not physically mixed. Due to this separation of the primary and secondary coolant systems, which is a preferred embodiment of the invention, the possibility of the contamination of the secondary helium gas by fission products which have leaked out of fuel elements 16 and into the circulating primary helium coolant gas is minimized. Similarly, the reactor primary helium gas coolant is protected from contamination by such means even if the secondary helium gas coolant—the process side of the gas coolant loop—becomes contaminated.

In another advantageous embodiment the primary and secondary gas coolants are maintained at pressures higher than atmospheric. These pressures are selected so as to optimize overall heat transfer effectiveness between the fuel elements 16 and the primary coolant, and between the primary and secondary coolants, as well as in view of core pressure drop and the pumping power of gas circulator 70. In illustration of a preferred embodiment of the invention, the pressure of the secondary coolant fed in through header 56 and removed through header 58 is maintained at a higher level than that of the primary coolant circulated through the reactor core. Accordingly, in the event of a leak between the two systems, flow will be from the secondary side to the primary side to prevent to the best extent possible the radioactive contamination of the secondary system.

Further, the containment vessel 26 is itself a pressure vessel, and it therefore serves to confine any contaminated reactor coolant gas which escapes from the reactor coolant system. Thus, the inner wall 30 of the tank means 34 functions as an initial containment barrier for such leaked coolant gas, and the outer wall 32 functions as a secondary containment barrier in the event that the inner wall leaks, and also as a crash barrier.

When the reactor system 10 in accordance with the present invention is operating normally, the forced circulation of gas coolant in heat transfer relationship with the reactor core 15 is effective to absorb the major portion of heat energy generated at the core. Nevertheless, a smaller amount of heat energy travels from the core to the wall of the reactor pressure vessel 12. The reactor pressure vessel wall is heated to approximately 200° C. (392° F.), which is slightly below the coolant gas inlet temperature. The heat energy which penetrates the uninsulated reactor pressure vessel wall travels across the space between that wall and the uninsulated containment vessel wall primarily by convection and radiation; the space within the chamber between the containment vessel and the reactor pressure vessel is typically occupied by air, but occupation by some other similar gas or mixture of gases is acceptable. The heat energy then travels through the uninsulated inner wall of the tank portion of the containment vessel. Heat flowing by conduction through this wall is absorbed by the water in the annularly configured tank, which water then boils. The vapor given off by the liquid body rises to the condenser unit 40. After expulsion of air from the condenser the boiling/condensing saturation temperature and pressure stabilize at values determined by the capacity of the condenser relative to the heat load received from the heat sink. The dynamics of this system are similar to those of a conventional heating system. The stabilizing temperature in this embodiment is about 65° C. (150° F.) to maximize the sensible heat absorbing capacity of the water above this temperature.

Therefore, under normal operating conditions, the reactor system of the present invention incorporates a means of transferring heat from the reactor pressure vessel wall to the atmosphere, which means operates continuously and is driven entirely by natural thermal forces, thereby eliminating the necessity for an automatic start-up or initiation of action by a human operator in case of an emergency. Of course, the continuous operation of the foregoing results in a continuous loss of heat from the system. However, the loss is small and is minimized since the reactor pressure vessel is cooled by the relatively low temperature coolant gas. The small heat loss, however, is more than offset by the advantages of providing passive means to cool the reactor under emergency conditions such as loss of forced gas circulation, even with gas coolant depressurization, as explained below.

In the event that forced circulation of gas coolant is interrupted when the reactor is critical and at power, the temperature of the reactor's fuel elements (assuming control rods are not inserted) rises to a point which causes the reactor to shut down by virtue of the negative temperature coefficient of reactivity which is inherent in the reactor's design. Because a sufficiently large amount of decay heat energy from the reactor core is conducted away from the reactor fuel elements to the heat sink, and then out of the reactor system and into the atmosphere, the temperature of the reactor system is not sufficiently increased—even with loss of forced circulation of the gas coolant and depressurization of the gas coolant—to cause the fuel's temperature to exceed the temperature at which fission products start to be released Particularly in the event of depressurization of the gas coolant, that is, a substantial loss of reactor coolant from the gas cooling system, it is an advantageous feature of certain embodiments of the invention that the volume of the chamber 28 between the containment vessel 26 and the reactor pressure vessel 12 is small enough so that a leak—even an uncontrolled leak—of reactor gas coolant from the coolant system into the chamber does not entirely depressurize the system. Rather, because the containment vessel is a pressure vessel and the chamber is of advantageously small volume, an equilibrium pressure is established in the chamber and in the reactor coolant system which is appreciably higher than atmospheric pressure. Preferably, the volume of the chamber is about the same as the volume of the primary coolant system or smaller so that at least half the initial coolant pressure is maintained. Accordingly, a sufficiently high density of gas coolant is maintained so that heat transfer by the cooling system still contributes to the removal of heat energy from the reactor fuel elements, and thus permits continued operation of the reactor at a reduced level. Additionally, because the pressure in the chamber between the containment and reactor pressure vessels is increased, and therefore the density of the gas occupying the chamber is increased, the heat conductivity of the material between the reactor pressure and containment vessel walls is increased, which increased conductivity increases the effectiveness of heat transfer from the reactor core to the heat sink. Accordingly, the operation of the passive heat dissipation means is also enhanced.

Another advantageous feature of embodiments of the invention illustrated in FIG. 3 is the provision of fuel handling space 76 below the containment vessel 26. The fuel handling space communicates with the reactor core enclosed within core container 14 via conduit 74. Fuel handling space 76 contains various conduits, and ducting, as well as mechanical devices, which are adapted to receive spherical fuel elements from the bottom of the pebble bed core in core container 14, and further adapted to examine those elements and recirculate them back into the pebble bed core at the top of core container 14 or route them for spent fuel disposal (the ducting and mechanical devices in the fuel handling space as well as the conduit means for recirculating the spherical fuel elements are not shown for the sake of simplicity). With such an arrangement, the rupture of conduit 74 or the other fuel handling equipment is a credible accident condition which must be taken into account. More specifically, a rupture of the foregoing kind which is large enough to allow some of the spherical fuel elements to blow out of the fuel handling equipment with sufficient velocity to cause them to break up upon impact would result in the release of fission products. The provision of containment vessel 26 in accordance with the present invention, however, protects against a contaminating interchange with the atmosphere in that event since the water-filled tank 34 acts as a biological shield and the balance of the containment vessel is also effective in confining radioactive contamination within.

Another feature of note is that the chamber 28 is also suitably configured so that both the inner surface of tank 34 and the outer surface of reactor pressure vessel 12 are completely accessible for periodic nondestructive testing inspection. Of course, it may be the case in some instances that the configuration of that chamber to permit such NDT inspection, as well as the desirability of configuring the chamber such that it accommodates leaked water in a volume below the level of the reactor pressure vessel, are considerations which compete with the minimization of the chamber's volume to maximize equilibrium pressure in the event of an uncontrolled leak of primary coolant gas. However, in such situations it is acceptable to depart from the preference for maintaining the chamber's volume at an amount comparable to that of the volume of the primary coolant gas body, as a lower coolant-leakage equilibrium pressure can be tolerated. In any event, it is desirable to maintain such equilibrium pressure at as high a value as practicable by minimizing the volume of the chamber to the extent feasible.

Figure 4:
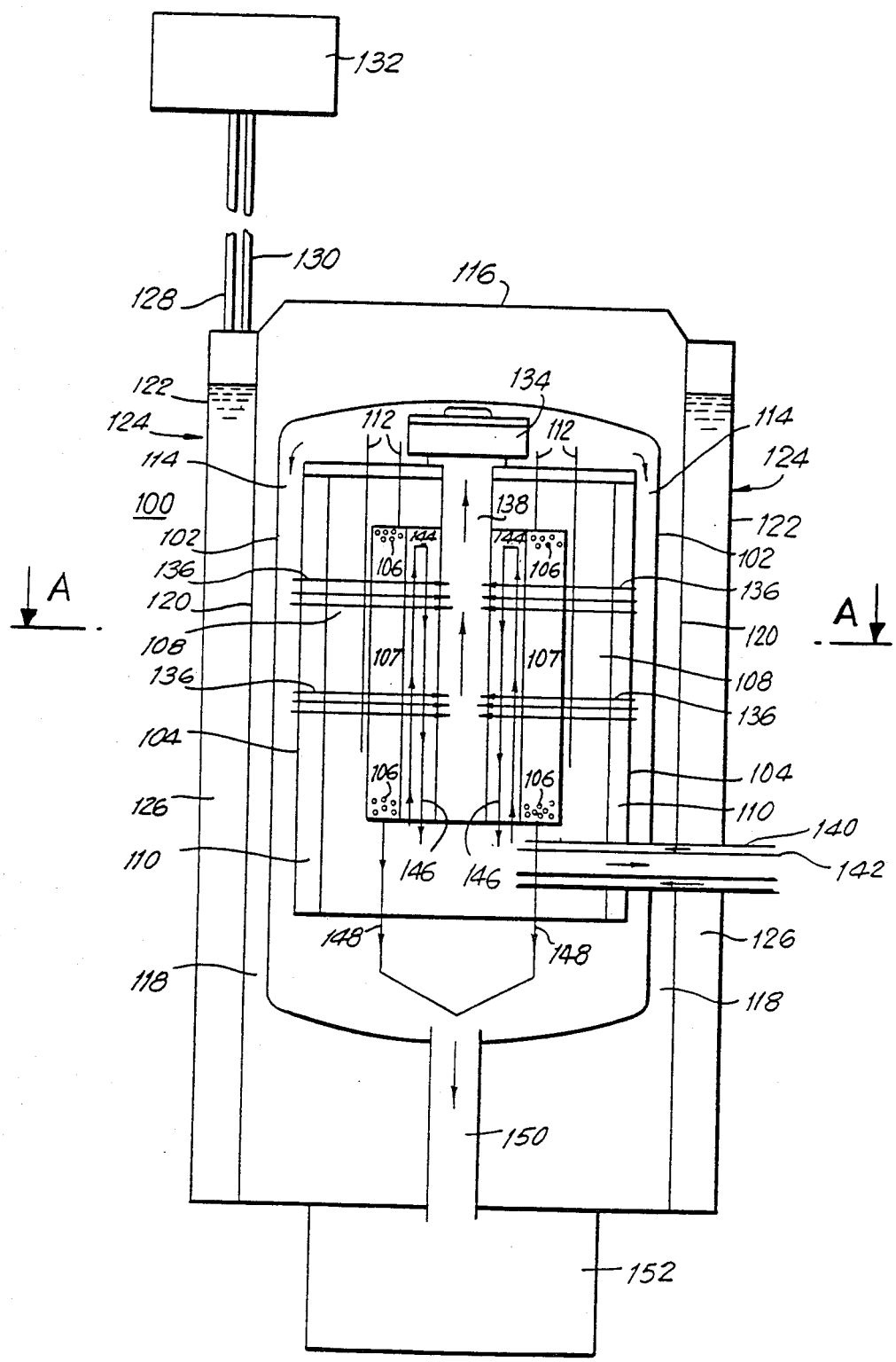
FIG. 4 is a schematic representation of a cross section of another reactor system in accordance with the invention.
Figure 5:
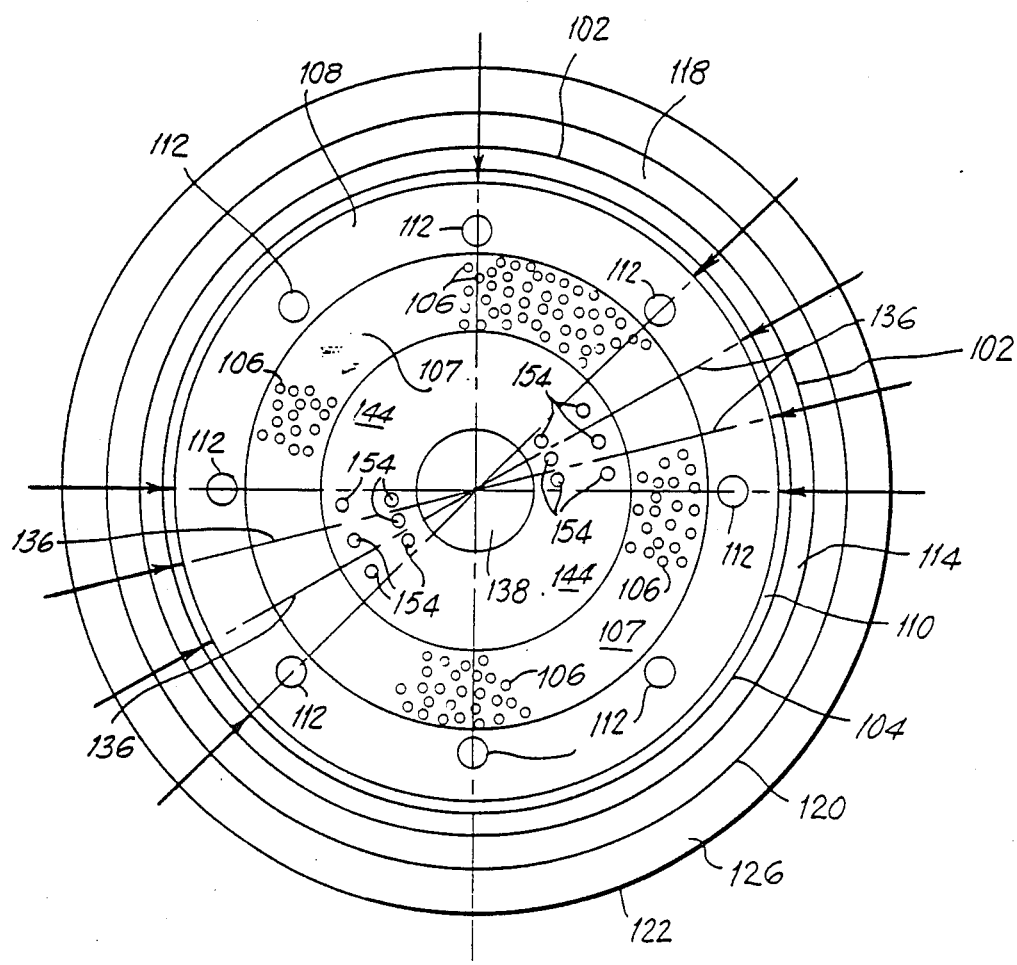
FIG. 5 is a cross-sectional schematic representation of the system of FIG. 4, taken at line A—A.

In FIGS. 4 and 5 there is illustrated an alternative embodiment of the present invention. Reactor system 100 includes an uninsulated steel reactor pressure vessel 102 of generally cylindrical configuration and in which in this embodiment pressure is maintained at 50 bar. Disposed within the reactor pressure vessel is generally cylindrical core container 104 which is also fabricated of steel and uninsulated. Disposed within the core container are spherical fuel elements 106 with multi-ceramic coated fuel particles embedded in the fuel elements which are arranged in a pebble bed core 107 of annular configuration. Adjacent the core is a graphite reflector 108 which is itself surrounded by a ceramic shell 110. Control rods 112, made of any suitable material, for example hafnium or boron carbide, are insertable into graphite reflector 108. Between the reactor pressure vessel 102 and core container 104 there is a gas space 114. Uninsulated steel containment vessel 116, which is itself a pressure vessel (pressure therein being maintained in this embodiment at 1 bar), is disposed about and spaced from reactor pressure vessel 102 to form chamber 118 between the two vessels. The containment vessel includes inner tank wall 120 and outer tank wall 122 which cooperate to form a tank 124 containing water 126 which is disposed about the reactor pressure vessel, and accordingly the core 107. The interior of tank 124 communicates with condenser 132 by means of a two-pipe system, namely, pipes 128 and 130. Alternatively, a one-pipe system can be used. The condenser is air-cooled by natural convection. The reactor pressure vessel 102 and containment vessel 116 are somewhat larger than, but on the same order of magnitude size as, the reactor pressure vessel 12 and the portion of the containment vessel 26A surrounding it as shown in and described with reference to FIG. 3.

When the reactor is critical and at power, a small fraction of heat energy generated in the core by the spherical fuel elements is transmitted through the graphite and ceramic materials (108 and 110, respectively), through core container 104, across gas space 114, through the wall of reactor pressure vessel 102, across chamber 118 and through inner wall 120, to be absorbed by water 126 in tank 124. The absorption of heat causes steam to be generated, which steam is conducted to condenser 132 via pipe 128. After the sensible and latent heat has been removed from the steam in condenser 132, the condensed liquid water is returned to tank 124 via pipe 130. Condenser 132 is appropriately sized to achieve boiling equilibrium at about 150° F.

Primary coolant gas, helium, is forced down through gas space 114 in the direction shown by the arrows, by the action of gas circulator 134. The primary "cold" helium gas, i.e., gas at a relatively low temperature (say about 300° C.), is conducted through passages in the ceramic and graphite materials (110 and 108, respectively), and then through the core 107 in a radial direction containing spherical fuel elements 106, and into heat exchange zone 144 along the paths shown by arrows 136. After passing through the core, the primary helium gas is "hot," i.e., at a relatively high temperature (e.g., 900° C.), having removed heat energy from the core. In heat exchanger zone 144 the "hot" primary helium gas is placed in heat transfer relationship with "cold" secondary helium gas, i.e., of relatively low temperature (say about 200° C.). The heat energy absorbed by the primary helium gas is thus transferred to the secondary helium gas, thereby cooling the primary helium gas, which then is conducted into passage 138 at the center of the annular core/heat exchanger arrangement. The primary helium gas, now "cold" (at relatively low temperature), is conducted up passage 138 in the direction shown by the arrows therein, and into circulator 134 for recycling.

Secondary "cold" helium gas is conducted to the heat exchanger zone through conduit 140, in the direction shown by the arrows. It is maintained at a pressure slightly higher than the primary gas circuit. The secondary "cold" helium gas is directed into heat exchanger zone 144 so that it can absorb heat from primary "hot" helium gas emerging from the reactor core. The secondary helium gas travels through the heat exchanger zone in a U-shaped path as shown by arrows 146. This path of travel is effected in practice by conducting the secondary helium gas through passages 154 in a graphitic heat exchanger, shown in cross-section in FIG. 5. When the secondary helium gas emerges at the bottom of the heat exchanger zone, it is heated from having absorbed the heat energy of the primary "hot" gas helium fed into the heat exchanger zone. The secondary "hot" helium gas is then conducted to and through conduit 142 and out of the reactor system for employment in generating electrical power, providing industrial process heat, or the like. In the event of a leak in the primary to secondary gas heat exchanger, leakage will be of the secondary cooling gas in, thereby minimizing the possibility of primary gas contaminated by fission products leaking out.

As with certain of the embodiments discussed in connection with FIG. 3, the volume of chamber 118 can be sufficiently small (preferably about the same volume as that of the primary coolant) so that should leakage (even uncontrolled leakage) of the primary helium gas coolant occur into it, a pressure above atmospheric (preferably about half the initial primary coolant pressure) would be maintained in the primary coolant system nonetheless. Also, chamber 118 can be configured so that a sufficiently large portion thereof lies below the level of the reactor pressure vessel so that, should the water 126 leak from the tank 124 into the chamber 118, the stabilized level of the water would be below that of the reactor pressure vessel 102.

Additionally, reactor system 100 is provided with piping or ducting and other fuel handling equipment for removing and/or recycling spherical fuel elements 106 from the reactor core. Upon removal, these fuel elements travel along paths 148 to conduit 150 which conducts the fuel elements to fuel handling space 152 where they are examined etc. by fuel handling equipment (not shown for the sake of simplicity).

As with the embodiment shown in FIG. 3, the containment vessel 116 is not only part of a passive heat dissipation arrangement, but additionally provides a water-filled tank which acts as a biological shield, and a barrier, to contain radioactive materials residing in the chamber due to release of fission products from the fuel elements, leakage of contaminated primary or secondary coolant gas, shattering of spherical fuel elements due to rupturing of the fuel handling equipment, etc.

In operation, the system shown in FIGS. 4 and 5 functions in the same general way as described for the system shown in FIG. 3 to provide passive heat energy dissipation preventing release of fission products despite the loss of forced gas cooling, even when coupled with depressurization of the primary coolant system.

Figure 6:
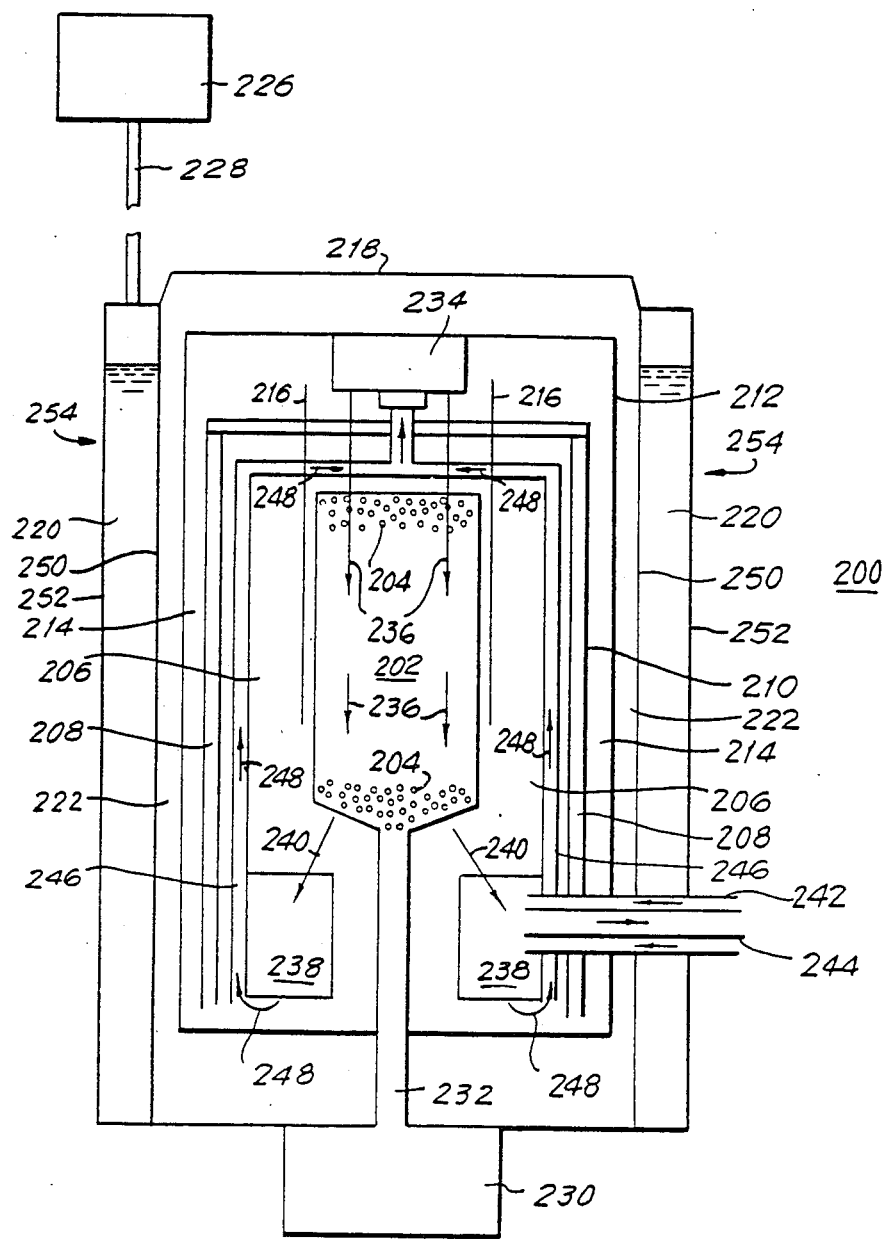
FIG. 6 is a schematic view of a cross section of still another embodiment of the invention.

In FIG. 6 is shown yet another embodiment of the present invention. Reactor system 200 comprises a core 202 made up of a pebble bed reactor containing spherical graphite fuel elements with multi-ceramic coated fuel particles embedded in the spherical fuel elements 204. The reactor core 202 is surrounded by a graphitic reflector 206 and a ceramic shell 208, which are in turn enclosed within core container 210. Reactor pressure vessel 212 (in which the pressure is maintained here at about 50 bar) is disposed about the core container 210 so as to form gas space 214 therebetween. Control rods 216 are insertable into graphite reflector 206.

A containment vessel 218 (also a pressure vessel in which a pressure of about 1 bar is maintained) is disposed about the reactor pressure vessel 212 in annular configuration, to form chamber 222 therebetween. The containment vessel includes inner wall 250 and outer wall 252 which cooperate to form tank 254. A body of liquid, in this case water 220, is located within the tank 254. The chamber 222 can be configured so that there is a sufficiently large portion of it below the reactor pressure vessel to accommodate water draining into it as a result of leakage (even uncontrolled leakage) from the tank 254; the level of water leaked into the chamber stabilizes below the reactor pressure vessel. The reactor pressure vessel and containment vessel are larger than but of the same order of magnitude size as reactor pressure vessel 12 and the portion of the containment vessel 26A surrounding it as shown in and described with reference to FIG. 3.

Gas circulator (a blower) 234 is mounted within the containment vessel 212 above the pebble bed reactor core 202. It is driven by an electric motor integrated in the circulator, hermetically sealed within the reactor pressure boundary, and utilizes magnetic bearings. The circulator forces primary helium gas into core 202, along the axial path shown by arrows 236. In the reactor, the primary "cold" helium gas (introduced at a relatively low temperature, for instance, about 300° C.) becomes "hot" due to its absorption of heat energy from the spherical fuel elements. The primary "hot" helium gas is then circulated along paths shown by arrows 240 into heat exchanger zones 238. The heat exchange equipment is fabricated of non-metallic materials (as is suitable for such equipment in the other embodiments of the invention). Secondary "cold" helium gas (at a relatively low temperature, say about 200° C.) is conducted into heat exchanger zones 238 through conduit 242. The primary "hot" helium gas and secondary "cold" helium gas are placed in heat transfer relationship in the heat exchanger zones, whereby the heat energy absorbed by the primary helium gas is transferred to the secondary helium gas. Primary "cold" helium gas then emerges from heat exchanger zones 238 as shown by arrows 248, and is directed into passages 246 through which it is conducted back to the circulator 234 as shown by arrows 248. Meanwhile, secondary "hot" helium gas is removed from heat exchanger zone 238 via conduit 244, and taken to a remote location where it is employed to generate electrical power, provide industrial process heat or the like.

The interior of tank 254 communicates, via a one-pipe system, with condenser 226, which is air-cooled by natural convection. Of course, a two-pipe system can be used in the alternative. When heat energy is transferred from the core 202 to the water 220 in tank 254, steam is generated and passed through pipe 228 to condenser 226, where the steam is cooled and condensed to remove heat (which is released to the atmosphere in hot air) and then returned as liquid water (again through pipe 228) to tank 254. In this way, a passive, continuously operating heat dissipation system is provided.

In this embodiment also, conduit 232 is provided to allow communication between core 202 and fuel handling zone 230. Spherical fuel elements 204 can be removed from cylindrical core 202 via conduit 232 in order to be received, examined and recycled by fuel handling equipment (not shown in the interest of simplicity) in the fuel handling zone and communicating with the upper end of the core.

Also, chamber 218 is sufficiently small so that even in the event of an uncontrolled leak of primary coolant gas into the chamber 218, the equilibrium pressure would be above atmospheric pressure. Preferably, chamber 218 is approximately the same volume as that of the primary coolant system so that the equilibrium pressure is about one-half that of the original pressure of the primary coolant.

As with the other embodiments illustrated in the foregoing figures, the water-filled tank surrounding the core, in addition to passive heat dissipation, provides a biological shield and prevents against the release of radioactive contamination into the atmosphere. Also, the containment vessel provides a barrier to contamination of the environment by radioactive materials escaping into chamber 222. This minimizes the danger of escape of fission products to the atmosphere, contamination of the primary or secondary coolant helium gas, or rupture of the fuel handling equipment with resultant expulsion and shattering of the fuel elements to release radioactive materials.

The containment vessel structure described herein is also suitably adapted to provide effective missile protection for the reactor system. The outer wall of the tank means as aforesaid can be fabricated to be sufficiently strong and heavy to provide substantial crash protection. Alternatively, the system can be enclosed in a building assembled from interlocking pre-stressed concrete elements, or the system can be placed in a silo in the ground, covered by a heavy missile-proof concrete slab or the like.

Therefore, it can be seen that the present invention provides an inherently safe reactor system which tolerates the loss of forced coolant circulation and/or depressurization of the coolant pressure, through the use of solely passive heat dissipation means, which are independent of automatic initiation or human operator action. Additionally, the present invention provides a source of nuclear heat that is more economical to build, operate, maintain and decommission by virtue of its small physical size, that is suitable for manufacture in a factory under controlled conditions, and that is inherently safe. As a result, the cost of compliance with government regulations is reduced, and the radiological cleanliness and the proliferation resistance of the reactor system are increased over conventional reactor systems. Furthermore, the present invention provides a reactor which substantially minimizes the possibility of radioactive interchange with the environment in the event of an uncontrolled primary coolant leak, and also in the event of rupture of the fuel circulation piping or other fuel handling equipment so as to cause ejection of fuel elements with their breakup upon impact and consequent release of radioactive materials. Accordingly, the present invention is a substantial advance in the art.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

We claim: =

1. A method of adapting a high-temperature gas cooled reactor suitable for modular utilization in combination with one or more other similar reactors to prevent release of fission products due to over heating, said reactor including a reactor pressure vessel, a reactor core enclosed in said reactor pressure vessel with fuel elements arranged as a pebble bed reactor, and pressurized forced circulation gas cooling system, which method comprises disposing a containment vessel about said reactor pressure vessel in spaced relationship to form a chamber between said vessels, such that a portion of the containment vessel comprising tank means including an inner wall and an outer wall is positioned surrounding said reactor core for the absorption of decay heat energy from the reactor core by a body of liquid which the tank means is adapted to hold;

providing, in operative association with said tank means, means for removing heat energy from vapor given off by said body of liquid as a result of said absorption of decay heat energy;

providing, in operative association with said tank means and said heat energy removal means, means for returning liquid, resulting from the removal of heat energy from said vapor, to the tank means;

said containment vessel's tank means being adapted to hold the liquid in an amount effective, under boiling equilibrium conditions established in cooperation with said heat removal and liquid return means, to absorb an amount of decay heat energy sufficient to prevent release of fission products resulting from loss of forced circulation of gas coolant, or such loss in combination with coolant depressurization, when the reactor is critical and at power; and said containment vessel being itself a pressure vessel capable of containing leaked reactor gas coolant which has been in heat transfer relationship with the reactor core; and providing a portion of the chamber between the containment vessel and the reactor pressure vessel below the level of the reactor pressure vessel in a sufficiently large size so that uncontrolled leakage of liquid held in the tank means into the chamber results in a stabilized level in the chamber which is below that of the reactor pressure vessel.

2. A method as defined in claim 1, which further comprises incorporating in the gas cooling system first confinement means defining a volume adapted for holding a primary coolant gas body in heat transfer relationship with said reactor core to remove decay heat energy generated at said core, and second confinement means defining a volume adapted for holding a secondary coolant gas body in heat transfer relationship with said primary coolant gas body to remove heat energy from said primary coolant gas body;

the volume of the chamber between the reactor pressure vessel and the containment vessel being sufficiently small that even upon uncontrollable leaking of primary coolant gas into said chamber the equilibrium pressure of the primary coolant in the volume defined by the first confinement means is still appreciably above atmospheric pressure.

3. A method as defined in claim 1, which further comprises disposing the containment vessel about the reactor pressure vessel in such a manner that a portion of the chamber between the vessels is located below the level of the reactor pressure vessel and that chamber portion is sufficiently large so that uncontrolled leakage of the body of liquid which the tank means is adapted to hold into the chamber results in a stabilized liquid level in the chamber which is below that of the reactor pressure vessel.

4. A passive heat energy removal device for a modular high-temperature gas cooled nuclear reactor system for utilization in combination with one or more similar systems, which comprises a double walled tank surrounding and spaced from the reactor system and defining a first chamber between the tank and the reactor system, the walls of said tank defining a second chamber therebetween;

heat sink means in said second chamber for absorbing decay heat energy generated at the reactor core included within said reactor system; said heat sink means comprising a thermodynamic coolant which is in its liquid state in said second chamber and which boils when absorbing said decay heat energy; and means located above said second chamber in a closed circuit therewith for receiving coolant vapor boiled off from said second chamber and condensing said vapor thereby to remove heat energy from said heat sink means; said second chamber, coolant and condensing means being selected relative to said reactor core to remove heat energy at a rate sufficient to maintain the capacity of the heat sink means for absorption of decay energy such that release of fission products resulting from loss of forced circulation of gas coolant, or such loss in combination with gas coolant depressurization, when the reactor is critical and at power, is prevented;

said heat sink means and means for condensing coolant vapor from said heat sink means being arranged to absorb and remove decay heat energy passively without either human or automatic activation in response to diminution of the gas coolant's cooling capacity; and wherein a portion of the first chamber between the tank and the reactor system therein is disposed below the level of the pressure vessel in said system and is sufficiently large so that uncontrolled leakage of liquid in the tank into the first chamber results in a stabilized liquid level in the first chamber which is below that of the reactor pressure vessel.

5. A device as defined in claim 4 wherein said coolant is liquid water.

6. A device as defined in claim 5 wherein said means for receiving coolant is an ambient air-cooled condenser.

7. A high-temperature gas-cooled nuclear reactor system suitable for modular utilization in combination with one or more other similar nuclear reactor systems including a reactor pressure vessel, a reactor core enclosed in said reactor pressure vessel with fuel elements arranged as a pebble bed reactor, a pressurized forced circulation gas cooling system, a containment vessel disposed about and spaced from said reactor pressure vessel to from a chamber between said vessels, a portion of the containment vessel defining a tank including an inner wall and an outer wall, surrounding said reactor core and a body of thermodynamic liquid in said tank for absorbing decay heat energy generated at the reactor core and leaving the reactor pressure vessel, said containment vessel being itself a pressure vessel adapted to contain leaked reactor gas coolant which has been in heat transfer relationship with the reactor core, said liquid being adapted to boil upon absorption decay heat; and means located above said tank and connected to it for receiving coolant vapor rising from the surface of coolant liquid in the tank and removing heat energy from such vapor by condensation of vapor given off by said body of liquid as a result of the absorption of decay heat energy, and at least one pipe for returning liquid from said means for receiving vapor, to the tank, said tank being adapted to hold said liquid coolant in an amount effective, under boiling equilibrium conditions established in cooperation with said heat energy removal means and liquid return means, to absorb an amount of decay heat energy sufficient to prevent release of fission products resulting from loss of forced circulation of gas coolant, or such in combination with coolant depressurization, when the reactor is critical and at power: and, wherein a portion of the chamber between the containment vessel and the reactor pressure vessel is disposed below the level of the reactor pressure vessel and is sufficiently large so that uncontrolled leakage of liquid held in the tank into the chamber results in a stabilized liquid level in the chamber which is below that of the reactor pressure vessel.

8. A reactor system as defined in claim 7, wherein the gas-cooling system of the reactor comprises means for gas cooling of said reactor core positioned at least partly within said reactor pressure vessel and adapted for removing core-generated heat energy, which means included means for effecting heat transfer relationship between a primary coolant gas body and the reactor core to remove from said reactor core heat energy generated thereat, and means for effecting heat transfer relationship between a secondary coolant gas body and said primary coolant gas body to remove heat from said primary coolant gas body.

9. A reactor system as defined in claim 8, wherein the gas cooling system of the reactor includes a non-metallic gas-to-gas heat exchanger.

10. A reactor system as defined in claim 8, which further comprises means for maintaining the secondary coolant gas body at a pressure higher than the primary coolant gas body in order that flow of any leakage between the two gas bodies will be into the primary coolant gas body.

11. A reactor system as defined in claim 8, wherein the means for effecting heat transfer relationship between the primary and secondary coolant gases is within the reactor pressure vessel.

12. A reactor system as defined in claim 8, wherein the means for effecting heat transfer relationship between the primary and secondary coolant gases is outside the reactor-pressure vessel.

13. A reactor system as defined in claim 8, which further comprises means for directing the flow of primary coolant gas axially or radially in respect of the core.

14. A reactor system as defined in claim 13, wherein the core is cylindrical in configuration and wherein the means for directing primary coolant gas flow directs said flow axially in respect of the core.

15. A reactor system as defined in claim 13, wherein the core is cylindrical in configuration and wherein the means for directing primary coolant gas flow directs said flow radially in respect of said core.

16. A reactor system as defined in claim 8, wherein the primary and secondary coolant gases are helium.

17. A reactor system as defined in claim 7, wherein said reactor core is cylindrical or annular configuration.

18. A reactor system as defined in claim 7, wherein the means for condensing coolant is appropriately sized so that boiling equilibrium is established at a temperature of about 150° F.

19. A reactor system as defined in claim 7, wherein said gas cooling system comprises a gas-to-gas heat exchanger, first confinement means defining a volume adapted for holding a primary coolant gas body in heat transfer relationship with said reactor core to remove heat energy generated at said core, and second containment means defining a volume adapted for holding a secondary coolant gas body in heat transfer relationship with said primary coolant gas body to remove heat energy from said primary coolant gas body;

the volume of the chamber between the reactor pressure vessel and the containment vessel being sufficiently small that even upon uncontrollable leaking of primary coolant gas into said chamber the equilibrium pressure of the primary coolant in the volume defined by the first confinement means is still appreciably above atmospheric pressure.

20. A reactor system as defined in claim 7 which further comprises conduit means and a fuel handling zone containing other fuel handling equipment for removing or recycling fuel elements from the reactor core, and wherein said containment vessel is adapted to constitute a barrier to release of radioactive materials escaping from the fuel elements in the event of a rupture of the fuel handling equipment and consequent expulsion therefrom and shattering of the fuel elements.

21. A small modular nuclear reactor system suitable for high temperature generation of electrical power or industrial process heat and adapted for the prevention of accidental release of fission products, which comprises a reactor pressure vessel;

a core container enclosed within and spaced from said reactor pressure vessel, in which core container is contained a plurality of sperical fuel containing multi-coated fuel particles, said elements being arranged in the form of a pebble bed reactor to form a core;

means for controlling the reaction in said core;

means for gas-cooling of said core, said means being located at least partly within said reactor pressure vessel and adapted for removing heat energy generated at said core, and said means including a gas-to-gas heat exchanger;

said gas-cooling means containing first confinement means for holding, in heat transfer relationship with said core, a primary coolant gas body in a volume defined by that first confinement means; and second confinement means for holding in heat transfer relationship with said primary coolant gas body, a secondary coolant gas body in a volume defined by that second confinement means;

a containment vessel disposed about and spaced from said reactor pressure vessel to form a chamber between the two vessels, said containment vessel including an inner wall and an outer wall defining a tank surrounding said core and a body thermodynamic coolant liquid in said tank positioned to absorb decay heat energy generated at said core and leaving the reactor pressure vessel, said liquid being adapted to boil upon absorption of said decay heat energy to emit coolant vapors from the upper surface of the liquid in the tank;

said containment vessel being itself a pressure vessel adapted to contain leaked reactor gas coolant which has been in heat transfer relationship with the reactor core;

the volume of the chamber between the reactor pressure vessel and the containment vessel being sufficiently small that even upon uncontrollable leaking of primary coolant gas into said chamber the equilibrium pressure of the primary coolant in the volume defined by the first confinement means is still appreciably above atmospheric pressure;

the volume of that portion of the chamber between the containment vessel and the reactor pressure vessel which is below the reactor pressure vessel being sufficiently large so that uncontrolled leaking of said liquid into the chamber results in a stabilized liquid level in the chamber which is below that of the reactor pressure vessel;

means located above said tank for receiving coolant vapor from the surface of liquid in said tank and condensing said vapor to a liquid; and means for connecting said condensing means to said tank and for returning liquid condensed from said vapor to said liquid body in said tank by gravity flow;

said tank being adapted to hold said liquid in an amount effective, under boiling equilibrium conditions established in cooperation with said condensing means and recycling mean, to absorb an amount of decay heat energy sufficient to prevent release of fission products resulting from loss of forced circulation of gas collant, or such loss in combination with coolant depressurization, when the reactor is critical and at power.

* * * * *